(12) United States Patent
Sasaki et al.

(10) Patent No.: US 6,838,160 B2
(45) Date of Patent: Jan. 4, 2005

(54) TITANIA ULTRATHIN FILM AND METHOD FOR PRODUCING IT

(75) Inventors: Takayoshi Sasaki, Ibaraki (JP); Yasuo Ebina, Ibaraki (JP); Mamoru Watanabe, Ibaraki (JP)

(73) Assignee: National Institute for Research in Inorganic Materials, Tsukuba (JP)

( * ) Notice: Subject to any disclaimer, the term of this patent is extended or adjusted under 35 U.S.C. 154(b) by 32 days.

(21) Appl. No.: 09/770,400

(22) Filed: Jan. 29, 2001

(65) Prior Publication Data

US 2001/0024718 A1 Sep. 27, 2001

(30) Foreign Application Priority Data

Mar. 24, 2000 (JP) ........................................ 2000-083654

(51) Int. Cl.[7] .............................. B32B 5/16; B32B 3/00; B05D 1/18

(52) U.S. Cl. ...................... 428/220; 428/323; 428/332; 428/333; 428/339; 428/923; 428/926; 427/430.1; 427/443.2

(58) Field of Search ................................. 428/220, 323, 428/328, 332–337, 339, 411.1, 923, 926; 427/430.1, 443.2

(56) References Cited

U.S. PATENT DOCUMENTS 5,665,422 A * 9/1997 Endo et al. .................... 427/71
5,935,717 A * 8/1999 Oishi et al. .................. 428/480
6,113,861 A * 9/2000 Ogata .......................... 422/122

* cited by examiner

Primary Examiner—Sheeba Ahmed
(74) Attorney, Agent, or Firm—Oblon, Spivak, McClelland, Maier & Neustadt, P.C.

(57) ABSTRACT

A multilayer ultrathin film which comprises layers of a polymer and layers of lamina particles alternately assembled, said lamina particles are obtained by exfoliating microcrystals of a layered titanium oxide.

15 Claims, 6 Drawing Sheets

TITANIA ULTRATHIN FILM AND METHOD FOR PRODUCING IT

BACKGROUND OF THE INVENTION

1. Field of the Invention

The present invention relates to a titania ultrathin film which is useful for ultraviolet shield coating of a window material which absorbs ultraviolet light having a wavelength of at most 300 nm with a high efficiency and others, and which is expected as a thin film for photoelectric conversion, a photochromic material, a photocatalyst thin film and a sensor, and a method for producing it.

2. Discussion of Background

A titania thin film is prepared conventionally by coating the surface of a substrate with a titania sol prepared by hydrolyzing a suitable titanium compound (such as titanium sulfate or titanium alkoxide) by means of e.g. spin coating. In such a case, the film thickness is at least sub-$\mu$m for the most part.

Further, colloidal particles dispersed in the sol have sizes of at least several nanometers and are in a substantially isotropic form, and the obtained thin film is a dense aggregate of spherical particles.

SUMMARY OF THE INVENTION

It is an object of the present invention to develop a novel ultrathin film having controllability of e.g. microstructure and film thickness and physical properties such as light absorptivity which are significantly different from those of a conventional thin film.

The present invention relates to a multilayer ultrathin film having layers of titania nanosheets and layers of an organic polymer alternately accumulated, and a method for producing it.

Namely, the present invention provides a multilayer ultrathin film which comprises layers of a polymer and layers of lamina particles alternately assembled, said lamina particles are obtained by exfoliating microcrystals of a layered titanium oxide.

The present invention further provides the above ultrathin film, wherein the lamina particles are titania nanosheets having a compositional formula of $Ti_{1-\delta}O_2$ ($0 \leq \delta \leq 0.5$).

The present invention further provides the above ultrathin film, of which the film thickness can be controlled within a range of from sub-nm to nm, specifically from 0.5 nm to 2 nm.

The present invention further provides the above ultrathin film, which absorbs ultraviolet light having a wavelength of at most 300 nm with a high efficiency.

The present invention further provides a method for producing the above titania ultrathin film, which comprises repeatedly soaking a substrate alternately in a sol having titania nanosheets suspended and in a cationic polymer solution so that the nanosheets and the polymer are adsorbed on the substrate each in a thickness of from sub-nm to nm level to form a multilayer having said components alternately accumulated.

DETAILED DESCRIPTION OF THE PREFERRED EMBODIMENTS

Figure 1:
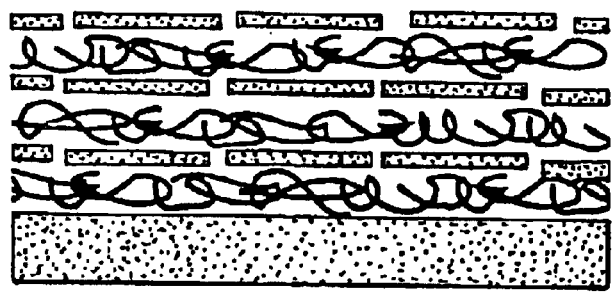
FIG. 1 is a conceptual diagram illustrating a process for forming a multilayer ultrathin film of titania nanosheets and an organic polycation.

In the present invention, titania nanosheets and an organic polycation are adsorbed from the respective liquid phases self-organizing-wise each in a form of a monolayer, and this operation is repeatedly carried out for film formation. Accordingly, there are characteristics in view of film formation processing, such that it is possible to control the film thickness extremely minutely within a range of from sub-nm to nm, and the composition and the structure of the film can be selected and controlled freely. Further, as titania nanosheets exfoliated and fragmentized to a thickness at the molecular level are used, the obtained ultrathin film has characteristic physical properties such as incommensurable light absorptivity as compared with a conventional titania thin film.

The titania nanosheets as a material to be accumulated on a substrate, are ones obtained by exfoliating a titanium oxide having a layered structure to a single host layer by applying a special chemical treatment to the titanium oxide, and have characteristic properties which are significantly different from those of conventional spherical fine particles, as a peculiar semiconductor two-dimensional crystal. The mother crystal as a layered structure crystal before exfoliation is composed of "host layers" having a strong chemical bond in a two-dimensional direction laminated one on another. On the contrary, the "host layer" is a elementary unit constituting the layered structure, and has an extremely small thickness at a level of 1 nm.

The above special chemical treatment is a combined treatment of an acid treatment and a delamination treatment. Namely, a titanium oxide powder having a layered structure is contacted with an aqueous acid solution of an acid such as hydrochloric acid, and the obtained product is subjected to filtration, washed and dried, whereupon all alkali metal ions present among layers before the treatment are replaced with hydrogen ions, and a protonated form is obtained. Then, the obtained protonic titanate is put in an aqueous solution of e.g. an amine, whereupon delamination takes place, and layers constituting the layered structure are exfoliated to a single piece.

The acid treatment as a preliminary step corresponds to a combined treatment of an acid treatment as disclosed in "Titanic acid having a rhombic laminar structure and its production method" (JP-B-6-99786, Japanese Patent No. 1966650) and "A compound having a monoclinic layered structure represented by a compositional formula of $H_2Ti_5O_{11} \cdot nH_2O$ and its production method" (JP-B-6-781661788, Japanese Patent No. 1936988) with a delamination treatment as disclosed in "Titania sol and its production method" (JP-A-9-25123, Japanese Patent No. 2671949) by the present inventors.

The layered titanium oxide as a starting compound may, for example, be a lepidocrocite type titanate ($Cs_xTi_{2-x/4}O_4$ wherein $0.5 \leq x \leq 1$ or $A_xTi_{2-x/3}Li_{x/3}O_4$ wherein A=K, Rb or Cs and $0.5 \leq x \leq 1$), trititanate ($Na_2Ti_3O_7$), tetratitanate ($K_2Ti_4O_9$) or pentatitanate ($Cs_2Ti_5O_{11}$). Such a titanium oxide is converted to a protonated type ($H_xTi_{2-x/4}O_4 \cdot nH_2O$, $H_{4x/3}Ti_{2-x/3}O_4 \cdot nH_2O$, $H_2Ti_3O_7 \cdot nH_2O$, $H_2Ti_4O_9 \cdot nH_2O$, $H_2Ti_5O_{11} \cdot nH_2O$) by an acid treatment, followed by shaking in an aqueous solution of e.g. a suitable amine for delamination.

In the obtained sol, pieces of the layers which constituted the mother crystal e.g. nanosheets are dispersed in water. The thickness of the nanosheets depends on the crystal structure of the starting mother crystal, but is extremely thin at a level of 1 nm. On the other hand, the width is at a level of $\mu m$, and the nanosheets have extremely high two-dimensional anisotropy.

Since the titania nanosheets have negative charge, by a combination with a polymer having positive charge, it becomes possible to let them be alternately adsorbed on the surface of an appropriately treated substrate self-organizing-wise. The essential feature of the present invention is to accumulate the above components layer by layer to form a titania ultrathin film as schematically shown in FIG. 1, by repeatedly carrying out the above operation.

As a practical operation, a series of steps is repeatedly carried out as required, one cycle comprising (1) soaking a substrate in a titania sol, (2) washing it with pure water, (3) soaking it in an organic polycation solution, and (4) washing it with pure water. As the organic polycation, e.g. polydimethyldiallyl ammonium chloride (PDDA), polyethylenimine (PEI) or polyallylamine hydrochloride (PAH) is suitable.

The substrate is not particularly limited basically so long as it is a solid substance which is stable in an aqueous solution, and its size is not particularly limited in principle. It may, for example, be a quartz glass plate, a Si wafer, a mica plate, a graphite plate or an alumina plate. It is essential to clean the surface of the substrate before the layering operation, and washing with a detergent, degreasing with an organic solvent or washing with concentrated sulfuric acid is usually carried out, followed by soaking the substrate in an organic polycation solution so that the polycation is adsorbed on the substrate, to introduce positive charge on the substrate surface. This is required to stably carry out the following layering operation.

Among process parameters of the above adsorption cycle, the concentration of the solution, pH and the soaking time are important to synthesize an ultrathin film of high quality. The concentration of the titania sol is preferably at most 5 wt %, particularly preferably at most 0.1 wt %. Further, since the nanosheets tend to aggregate in an acidic state, the pH is required to be at least 5, and it is preferably at least 7 for stable film formation. The organic polycation preferably has a concentration of at most 10 wt % and pH adjusted to be the same as the titania sol. The soaking time is required to be at least 10 minutes. If it is shorter than 10 minutes, the nanosheets or the polymer may not be adequately adsorbed on the substrate surface and the substrate may not adequately be covered. When the above conditions are satisfied, film formation can be carried out extremely stably.

Figure 2:
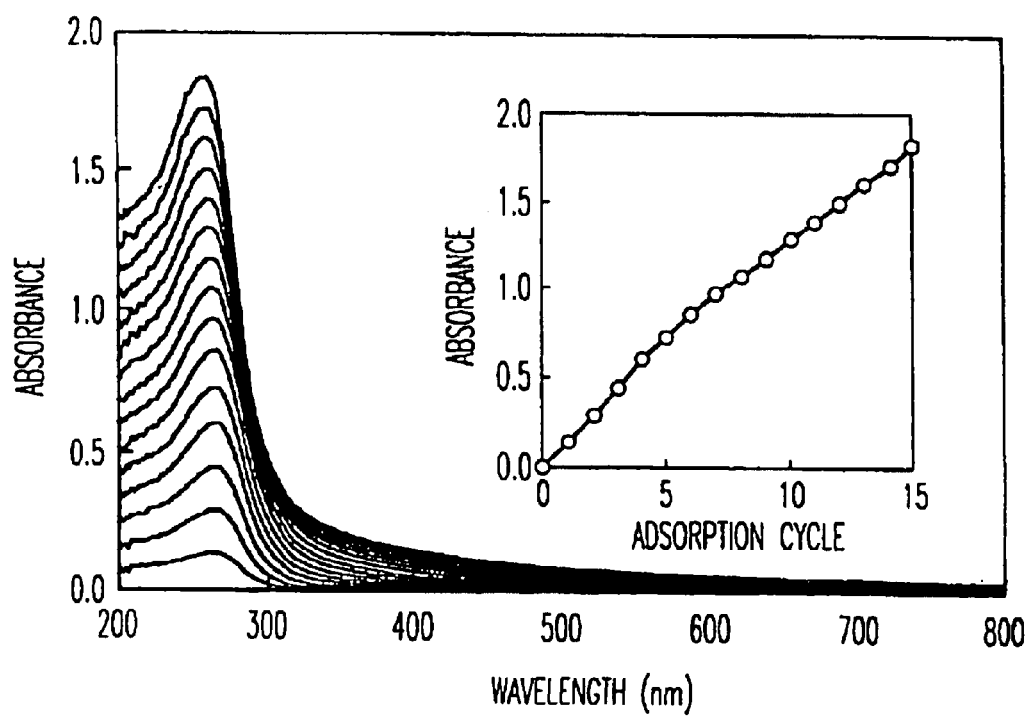
FIG. 2 is a graph illustrating ultraviolet/visible absorption spectrum in an accumulation step for forming a multilayer ultrathin film of titania nanosheets and PDDA.

As evident from FIG. 2 illustrating ultraviolet/visible absorption spectrum data of a case where PDDA as a typical example in combined with nanosheets, each of the components is adsorbed in substantially the same amount on the substrate surface in each adsorption step reproducibly and repeatedly and as a result, a multilayer film having layers of titania nanosheets and layers of PDDA alternately assembled can be obtained. The peak having a maximum at 265 nm is attributable to the nanosheets, and PEI and PDDA have no significant absorption within a range of from 200 to 800 nm.

Figure 3:
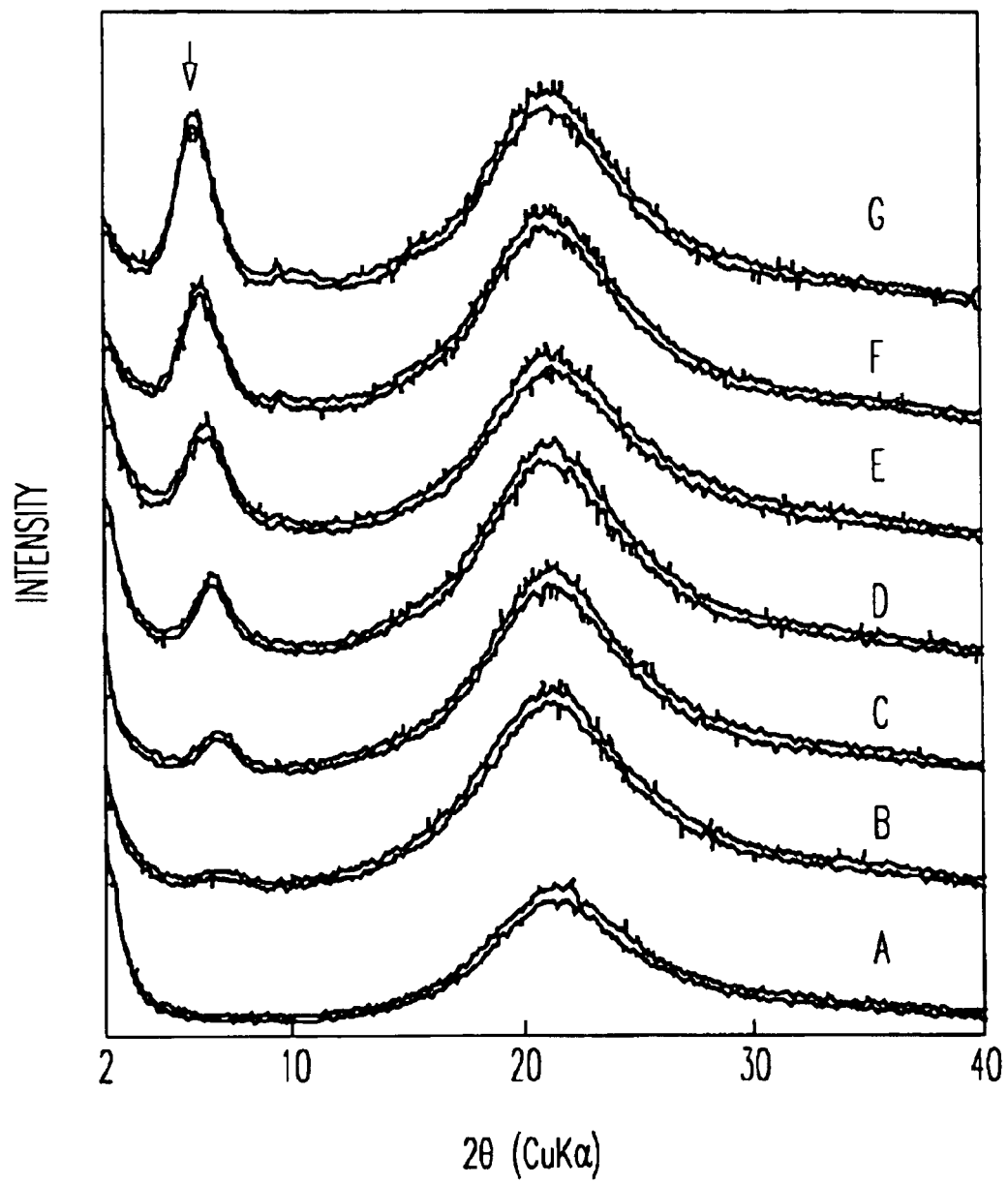
FIG. 3 is a graph illustrating an X-ray diffraction pattern in an accumulation step for forming a multilayer ultrathin film of titania nanosheets and PDDA.
Figure 4:
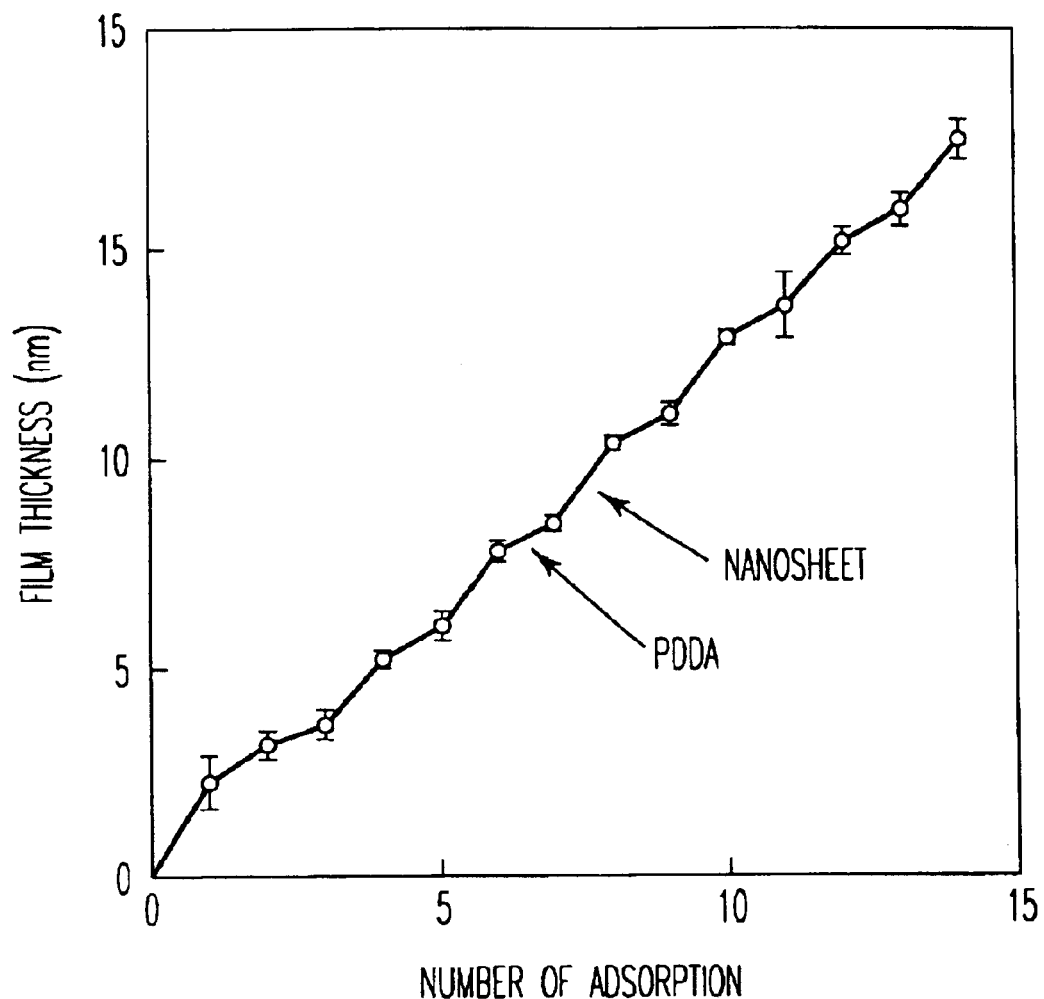
FIG. 4 is a graph illustrating changes in the film thickness in an accumulation step for forming a multilayer ultrathin film of titania nanosheets and PDDA.

The ultrathin film of the present invention has a high layering regularity, and shows a distinct diffraction peak based on the repeated period of nanosheets and PDDA (FIG. 3). Namely, FIG. 3 shows that nanosheets and PDDA alternately adsorbed and accumulated maintain an orderly multilayer nano-structure without big disorder after the film formation. As a more direct monitoring method of the film formation process, measurement of the film thickness by ellipsometry may be mentioned (FIG. 4), therefrom it is shown that the film thickness increases stepwise within a range of from sub-nm to nm after each adsorption step. Namely, it is possible to control the film thickness within such a minute range.

The above is summarized as follows. According to the present invention, it becomes possible to artificially construct a high quality multilayer ultrathin film consisting of titania nanosheets and an organic polycation with a precision of film thickness of at most 1 nm. The final film thickness depends on the number of the adsorption cycles, and may be so thick as a level of $\mu m$.

The titania ultrathin film thus prepared has distinct physical properties as compared with a conventional thin film made of titania ultrafine particles. One property is an intense absorptive power to ultraviolet light having a wavelength of at most 300 nm. FIG. 2 illustrates light absorptivity of the ultrathin film having titania nanosheets accumulated, said nanosheets obtained by exfoliating lepidocrocite type titanium oxide $H_xTi_{2-x/4}O_4 \cdot nH_2O$, and the absorbance per layer of nanosheets is so high as 0.14.

As the thickness of the layer of nanosheets is 0.75 nm, the absorbance per 1 nm of titania exceeds 0.18. As a data corresponding thereto, a value of about 0.05 is reported with respect to a thin film having titania ultrafine particles with an average size of 3 nm accumulated (Liu et al. J. Phys. Chem. B, 101, 1385, 1997), and there is a difference between the two by almost 40 times.

Such ultraviolet light absorption with a high efficiency is considered to be attributable to mainly that the titania nanosheets are fragmentized to a thickness at the molecular level of at most 1 nm, within a range of which a quantum size effect is obtained in a titanium oxide system.

The titania thin film is expected to be applied widely as ultraviolet light cutting coating, a component for a solar battery utilizing photoelectric effects, a photoluminescence material, a photocatalyst film or a sensor, utilizing its ultraviolet light absorptive power and energy. The titania ultrathin film of the present invention is expected to be very useful for such applications in view of its high ultraviolet light absorptive power.

Now, the present invention will be described in detail with reference to Examples. However, it should be understood that the present invention is by no means restricted to such specific Examples.

EXAMPLE 1

Cesium carbonate ($Cs_2CO_3$) and titanium dioxide ($TiO_2$) were mixed in a molar ratio of 1:5.3 and calcined at 800° C. for 40 hours to synthesize orthorhombic cesium titanate powder ($Cs_xTi_{2-x/4}O_4$; x=0.7). 1 g of this powder was contacted with 100 cm$^3$ of a 1 N hydrochloric acid solution, and they are reacted at room temperature while occasionally stirring them. The hydrochloric acid solution was renewed every day for three days, and the solid phase was collected by filtration, washed with water and air-dried.

0.5 g of the obtained layered titanic acid powder ($H_xTi_{2-x/4}O_4 \cdot nH_2O$) was added to 100 cm$^3$ of tetrabutyl ammonium hydroxide solution, followed by shaking (150 rpm) at room temperature for about 1 week to obtain a milk-white titania sol. A solution obtained by diluting the sol 50 times and a 2 wt % polydimethyldiallylammonium (PDDA) chloride aqueous solution were prepared, and their pH was adjusted to be 9.

A Si wafer or a quartz glass plate having a size of about 5 cm×1 cm as a substrate was washed with a 2% Extran MAO2 liquid manufactured by Merck & Co., Inc. and soaked in a solution of concentrated sulfuric acid and methanol in a ratio of 1:1. After 30 minutes, the substrate was taken out from the solution and adequately washed with Milli-Q filtered water. Then, the substrate was soaked in a polyethylenimine aqueous solution having a concentration of 0.25 wt % for 20 minutes and adequately washed with Milli-Q filtered water.

The substrate thus washed and subjected to a pretreatment was (1) soaked in the above titania sol solution. (2) After 20 minutes, it was adequately washed with Milli-Q filtered water and dried by spraying a stream of argon thereon. (3) Then, the substrate was soaked in the PDDA solution for 20 minutes, and (4) adequately washed with Milli-Q filtered water. The above steps (1) to (4) were carried out repeatedly to synthesize a titania ultrathin film.

After each film formation cycle, an X-ray diffraction pattern, ultraviolet/visible absorption spectrum and the film thickness by ellipsometry of the sample were measured to monitor the film formation state. FIG. 2 illustrates ultraviolet/visible absorption spectrum. The peak having a maximum at 265 nm is attributable to the nanosheets, and it is confirmed that the peak increased substantially linearly after each adsorption cycle. Since PEI and PDDA have no substantial peaks within a range of from 200 to 800 nm, it is clarified that the nanosheets were adsorbed and accumulated on the substrate in substantially the same amount after each adsorption cycle.

Further, from the X-ray diffraction data shown in FIG. 3, Bragg peaks showing a periodic structure of about 1.4 nm appeared, and the intensity increased along with increase in the adsorption number. The halo at 2θ=15 to 30° is attributable to the quartz glass substrate. In FIG. 3, symbols a to g designate the bilayer numbers, 1, 2, 3, 5, 7, 10 and 15, respectively.

Further, from ellipsometry (FIG. 4), it is confirmed that the film thickness increased within a range of from sub-nm to nm after each of the adsorption steps of the nanosheets and the polymer. The increasing amount supports the fact that the nanosheets and PDDA were accumulated on the substrate surface each in a form of a monolayer. Accordingly, it is confirmed that a multilayer ultrathin film having layers of nanosheets and layers of PDDA alternately assembled can be constructed.

EXAMPLE 2

Figure 5:
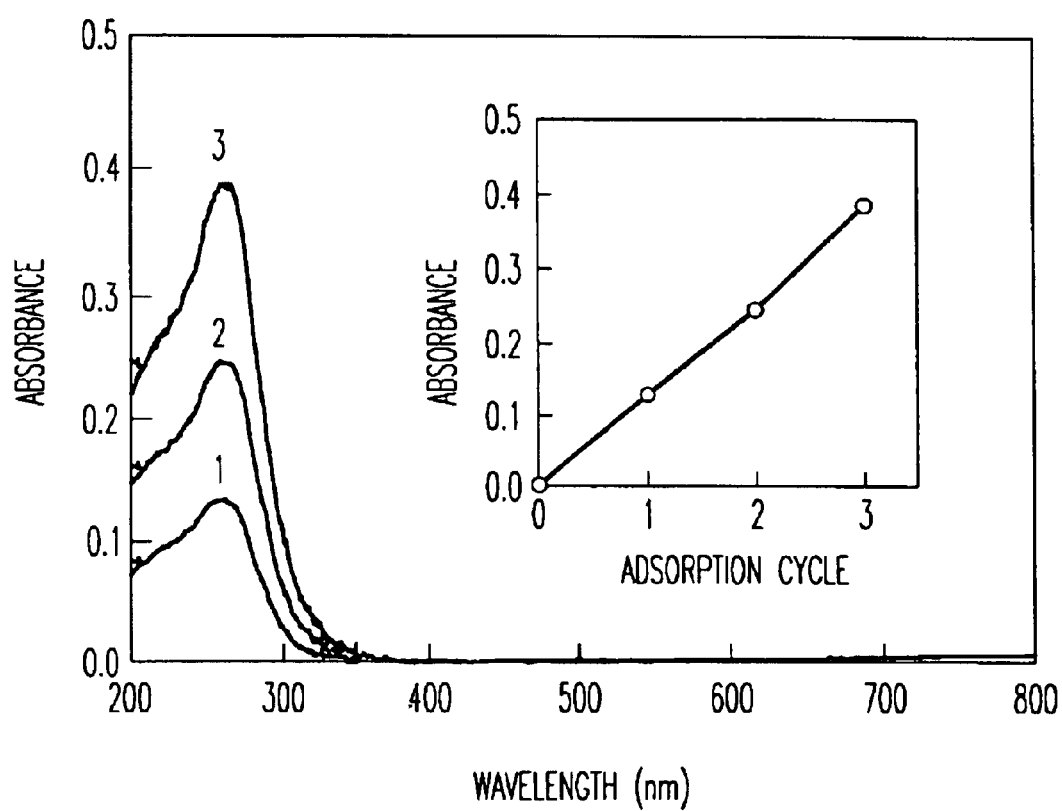
FIG. 5 is a graph illustrating ultraviolet/visible absorption spectrum in an accumulation step for forming a multilayer ultrathin film of titania nanosheets and PEI.
Figure 6:
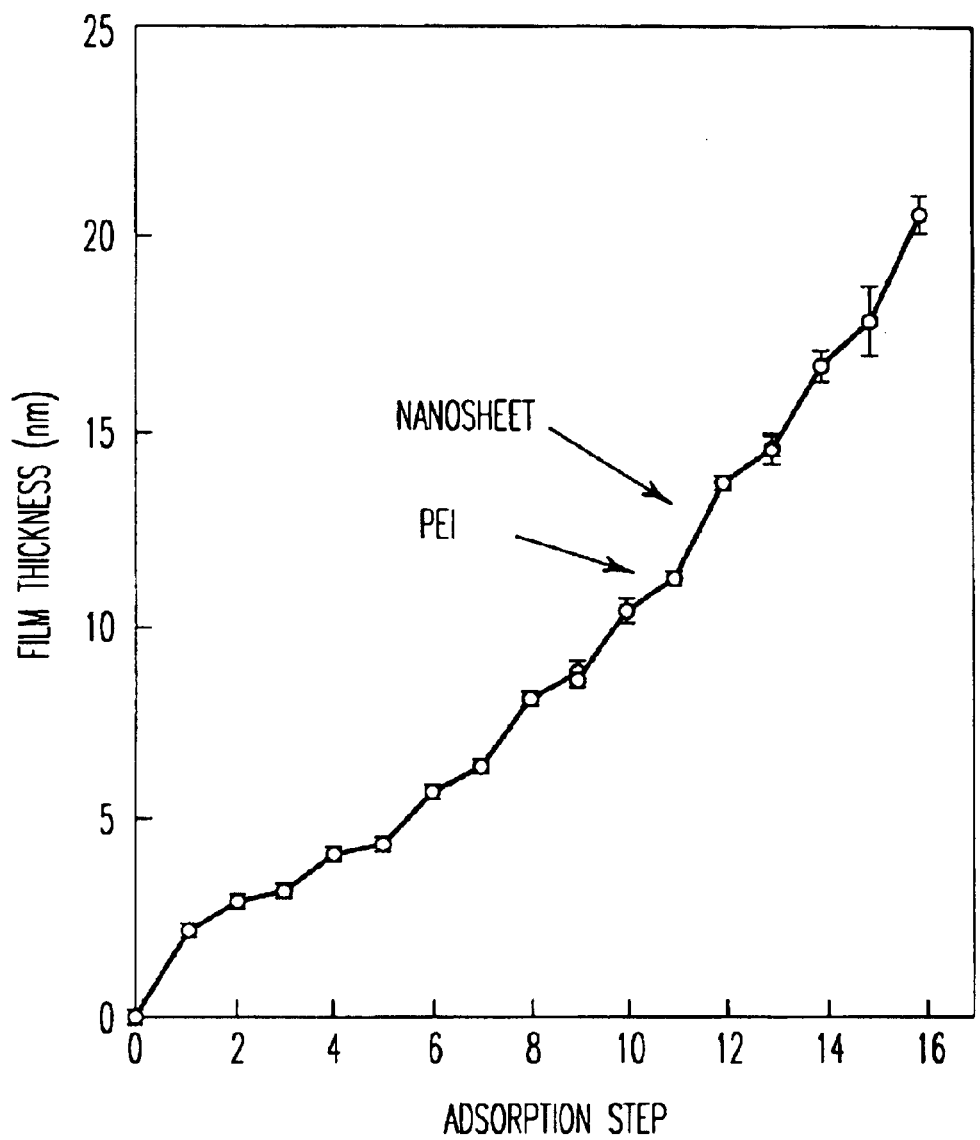
FIG. 6 is a graph illustrating changes in the film thickness in an accumulation step for forming a multilayer ultrathin film of titania nanosheets and PEI.
Figure 7:
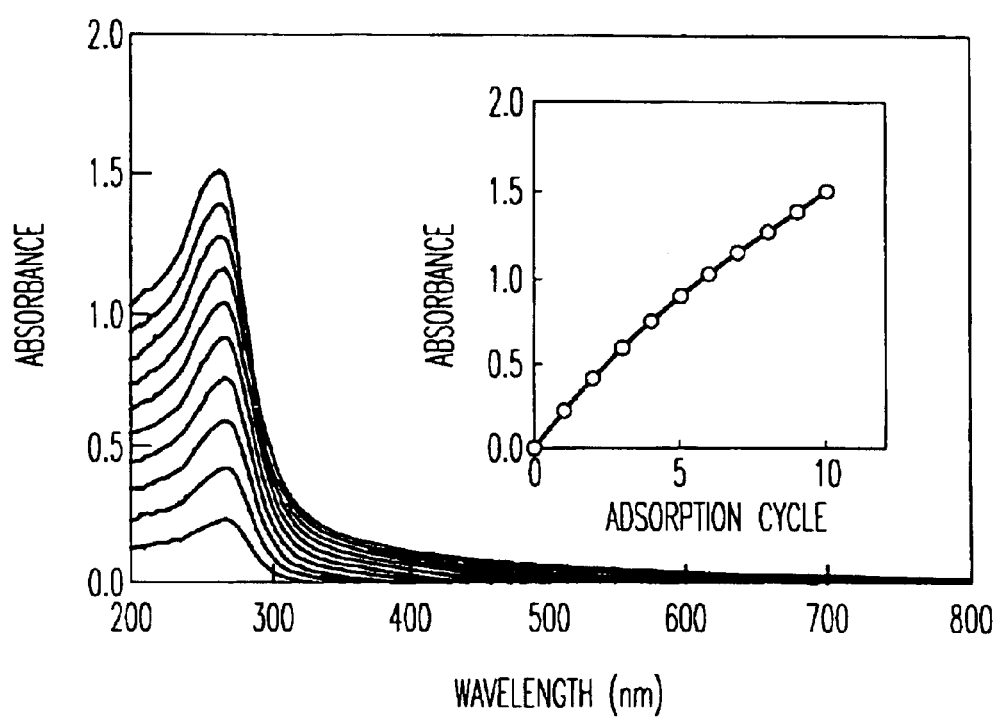
FIG. 7 is a graph illustrating ultraviolet/visible absorption spectrum in an accumulation step for forming a multilayer ultrathin film of titania nanosheets and PDDA.

A Si wafer substrate cleaned and subjected to a pretreatment in the same manner as in Example 1 was (1) soaked in the titania sol solution of Example 1. (2) After 20 minutes, it was adequately washed with Milli-Q filtered water and dried by spraying a stream of argon thereon. (3) Then, the substrate was soaked in a PEI solution (concentration: 0.25 wt %) for 20 minutes, and (4) adequately washed with Milli-Q filtered water. By repeatedly carrying out the above steps (1) to (4), it was attempted to synthesize a titania ultrathin film. The film formation process was monitored in the same manner as in Example 1 and as a result, increase in absorbance (FIG. 5) and increase in the film thickness at the nm level (FIG. 6) were confirmed after each adsorption cycle. Accordingly, formation of a multilayer ultrathin film of titania nanosheets and PEI was confirmed.

EXAMPLE 3

A layered titanic acid powder (compositional formula $H_{4x/3}Ti_{2-x/3}O_4 \cdot nH_2O$) obtained by an acid treatment of a lepidocrocite type mixed alkali layered titanium oxide having a compositional formula of $K_xTi_{2-x/3}Li_{x/3}O_4$ (x=0.8) was subjected to exfoliation in the same manner as in Example 1 to obtain a suspension, and the resulting suspension was adjusted to have a concentration of 0.01 wt % and a pH of 9.

A Si wafer substrate cleaned and subjected to a pretreatment in the same manner as in Example 1 was (1) soaked in the above titania sol solution. (2) After 20 minutes, the substrate was adequately washed with Milli-Q filtered water and dried by spraying a stream of argon thereon. (3) Then, the substrate was soaked in a PEI solution for 20 minutes, and (4) adequately washed with Milli-Q filtered water.

By repeatedly carrying out the above steps (1) to (4), it was attempted to synthesize a titania ultrathin film. The film formation process was monitored in the same manner as in Example 1 and as a result, stepwise increase in ultraviolet absorption peak intensity of the titania nanosheets was confirmed after each adsorption cycle. Accordingly, formation of a multilayer ultrathin film of titania nanosheets and PDDA was confirmed.

The entire disclosure of Japanese Patent Application No. 2000-083654 filed on Mar. 24, 2000 including specification, claims, drawings and summary are incorporated herein by reference in its entirety.

What is claimed is:

1. A multilayer ultrathin film which comprises layers consisting essentially of polymer layers and layers of lamina particles alternately assembled, said lamina particles being obtained by exfoliating microcrystals of a layered titanium oxide, a film thickness of each of the layers being controlled within a range of from sub-nm to nm.

2. The ultrathin film according to claim 1, which absorbs ultraviolet light having a wavelength of at most 300 nm with a high efficiency.

3. The ultrathin film according to claim 1, wherein the film thickness of each of the layers is from 0.5 nm to 2 nm.

4. The ultrathin film according to claim 1, wherein the film thickness of each of the layers is 1 nm.

5. The ultrathin film according to claim 1, which is in contact with a substrate selected from the group consisting of quartz glass plate, Si wafer, mica plate, graphite plate and alumina plate.

6. The ultrathin film according to claim 1, wherein the layered titanium oxide is selected from the group consisting of lepidocrocite titanate, trititanate, tetratitanate and pentatitanate.

7. The ultrathin film according to claim 1, wherein the layered titanium oxide is selected from the group consisting of $Cs_xTi_{2-x/4}O_4$ wherein $0.5 \leq x \leq 1$; $A_xTi_{2-x/3}Li_{x/3}O_4$ wherein A=K, Rb or Cs and $0.5 \leq x \leq 1$; $Na_2Ti_3O_7$; $K_2Ti_4O_9$ and $Cs_2Ti_5O_{11}$.

8. The ultrathin film according to claim 1, wherein the polymer layers comprise one or more polymers selected from the group consisting of polydimethyldiallyl ammonium chloride, polyethyleneimine, and polyallylamine hydrochloride.

9. The ultrathin film according to claim 1, wherein the lamina particles are titania nanosheets having a compositional formula of $Ti_{1-\delta}O_2$ ($0 \leq \delta \leq 0.5$).

10. The ultrathin film according to claim 9, wherein said titania nanosheets are derived from layered titanium oxide.

11. A method for producing the titania ultrathin film as defined in claim 1, which comprises repeatedly soaking a substrate alternately in a sol having titania nanosheets suspended and in a cationic polymer solution so that the nanosheets and the polymer are adsorbed on the substrate each in a thickness of from sub-nm to nm level to form a multilayer having said components alternately accumulated.

12. The method according to claim 11, wherein the concentration of the titania is at most 5 wt. %.

13. The method according to claim 11, wherein the pH is at least 5.

14. The method according to claim 11, wherein a film thickness of each of the layers is from 0.5 nm to 2 nm.

15. The method according to claim 14, wherein a film thickness of each of the layers is 1 nm.

* * * * *